United States Patent
Trinkle et al.

(10) Patent No.: US 10,630,227 B2
(45) Date of Patent: Apr. 21, 2020

(54) METHOD FOR TYPE-SPECIFIC OPERATING OF AN ELECTRIC DRIVE UNIT AND SYSTEM

(71) Applicant: Andreas Stihl AG & Co. KG, Waiblingen (DE)

(72) Inventors: Simon Trinkle, Kaiserbach (DE); Andreas Wachtel, Waiblingen (DE); Tommy Roitsch, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/295,128

(22) Filed: Mar. 7, 2019

(65) Prior Publication Data

US 2019/0280639 A1     Sep. 12, 2019

(30) Foreign Application Priority Data

Mar. 8, 2018 (EP) .................... 18160652

(51) Int. Cl.
*H02P 29/40* (2016.01)
*A01G 20/47* (2018.01)
(Continued)

(52) U.S. Cl.
CPC ............ *H02P 29/40* (2016.02); *A01D 34/416* (2013.01); *A01G 3/053* (2013.01); *A01G 3/086* (2013.01);
(Continued)

(58) Field of Classification Search
CPC ...... A01G 23/087; A01G 3/088; A01G 20/47; A01G 3/053; A01G 3/086; B25F 5/00; B25F 5/006; A01D 34/416; H02P 29/40
See application file for complete search history.

(56) References Cited

U.S. PATENT DOCUMENTS 6,540,032 B1 * 4/2003 Krueger ............... E21B 17/028
                                                          175/40
2002/0050168 A1   5/2002 Bongers-Ambrosius et al.
(Continued)

FOREIGN PATENT DOCUMENTS

DE            199 60 824 A1     6/2001
DE    10 2007 056 319 A1     5/2009
(Continued)

OTHER PUBLICATIONS

Extended European Search Report issued in counterpart European Application No. 18160652.6 dated Sep. 25, 2018 with partial English translation (six (6) pages).

*Primary Examiner* — Thai T Dinh
(74) *Attorney, Agent, or Firm* — Crowell & Moring LLP (57) ABSTRACT

A method is provided for type-specific operating of an electric drive unit, wherein the drive unit is configured for coupling and driving a tool unit selected from a set of different types of tool units. The set includes at least one rotatory tool unit and at least one non-rotatory tool unit. The method includes: driving of a coupled tool unit by the drive unit; identifying operating data of the drive unit during the driving procedure; determining, based on the identified operating data, whether the coupled tool unit is a rotatory tool unit or a non-rotatory tool unit; and controlling the drive unit in a rotation control mode if the coupled tool unit is determined to be a rotatory tool unit, or in a non-rotation control mode if the coupled tool unit is determined to be a non-rotatory tool unit.

12 Claims, 5 Drawing Sheets

(51) Int. Cl.

| | | |
|---|---|---|
| *A01D 34/416* | (2006.01) | |
| *A01G 3/053* | (2006.01) | |
| *A01G 3/08* | (2006.01) | |
| *B25F 5/00* | (2006.01) | |
| *B25F 3/00* | (2006.01) | |
| *A01G 3/04* | (2006.01) | |

(52) U.S. Cl.
CPC .............. *A01G 20/47* (2018.02); *B25F 3/00* (2013.01); *B25F 5/00* (2013.01); *A01G 2003/0461* (2013.01)

(56) References Cited

U.S. PATENT DOCUMENTS

| | | | | |
|---|---|---|---|---|
| 2007/0297889 | A1* | 12/2007 | Rouweler | B25J 15/04 414/733 |
| 2008/0196912 | A1* | 8/2008 | Gass | B23B 31/123 173/4 |
| 2010/0028093 | A1 | 2/2010 | Otsuka | |
| 2012/0318545 | A1 | 12/2012 | Schreiber | |
| 2014/0070924 | A1 | 3/2014 | Wenger et al. | |
| 2014/0184397 | A1 | 7/2014 | Volpert | |
| 2016/0227694 | A1* | 8/2016 | Bermudez | A01B 1/065 |
| 2016/0342142 | A1 | 11/2016 | Boeck et al. | |
| 2016/0375570 | A1 | 12/2016 | Boeck et al. | |
| 2017/0008159 | A1 | 1/2017 | Boeck et al. | |
| 2018/0116104 | A1 | 5/2018 | Alexandersson et al. | |
| 2018/0168691 | A1* | 6/2018 | Singh | A61B 17/62 |

FOREIGN PATENT DOCUMENTS

| | | |
|---|---|---|
| DE | 10 2011 104 901 A1 | 12/2012 |
| DE | 10 2014 208 980 A1 | 7/2015 |
| DE | 10 2014 209 009 A1 | 7/2015 |
| DE | 10 2014 209 032 A1 | 7/2015 |
| EP | 2 127 790 A1 | 12/2009 |
| EP | 2 353 539 A1 | 8/2011 |
| EP | 2 521 206 A1 | 11/2012 |
| EP | 2 529 894 A1 | 12/2012 |
| FR | 3 039 087 A1 | 1/2017 |
| WO | WO 2016/150514 A1 | 9/2016 |

\* cited by examiner

METHOD FOR TYPE-SPECIFIC OPERATING OF AN ELECTRIC DRIVE UNIT AND SYSTEM

CROSS REFERENCE TO RELATED APPLICATIONS

This application claims priority under 35 U.S.C. § 119 from European Patent Application No. 18160652.6, filed Mar. 8, 2018, the entire disclosure of which is herein expressly incorporated by reference.

BACKGROUND AND SUMMARY OF THE INVENTION

The invention relates to a method for type-specific operating of an electric drive unit and to a system.

The invention addresses the problem of providing a method for operating an electric drive unit that has improved properties, in particular more functionalities. The invention also addresses the problem of providing a system.

The invention solves this problem by providing a method and a system in accordance with the claimed invention.

The invention relates to a method, in particular an automatic method, for type-specific operating of an electric drive unit. The drive unit is configured for coupling, in particular mechanically coupling, in particular by a user, and driving, in particular mechanically driving, a tool unit, in particular a coupled tool unit. The tool unit, in particular the coupled tool unit, is selected from a set or a group of different types of tool units, in particular by the user. The set includes at least one rotatory tool unit and at least one non-rotatory tool unit. The method according to the invention comprises the steps: a) driving, in particular automatically driving, or putting into operation a coupled tool unit by the drive unit; b) identifying, in particular automatically identifying, or detecting operating data of the drive unit during the driving procedure or step a); c) determining, in particular automatically determining, recognizing or ascertaining or calculating, based on the identified operating data, whether the coupled tool unit is in particular either a, in particular the, rotatory tool unit, or a, in particular the, non-rotatory tool unit; and d) controlling, in particular automatically controlling, the drive unit in, in particular either, a rotation control mode when or if the coupled tool unit is determined to be a rotatory tool unit, or a non-rotation control mode when or if the coupled tool unit is determined to be a non-rotatory tool unit.

The method or the type-specific control mode, in particular the rotation control mode and the non-rotation control mode, of the drive unit makes it possible to operate the coupled tool unit optimally and/or to recognize and consequently solve or even avoid from the outset at least a type-specific problem or at least a type-specific problem case of the coupled tool unit. The type-specific control mode of the drive unit is made possible by determining the type of the coupled tool unit, in particular a rotatory tool unit or a non-rotatory tool unit.

In particular, the method makes possible an indirect or independent or autonomous determination of the type of the coupled tool unit, in particular by the drive unit. In other words: the type of the coupled tool unit need not or may not be indicated by the user and/or determined directly, in particular by means of recognizing a type identification element on the coupled tool unit such as an RFID transponder by an identification detecting device on the drive unit. In particular, operating data of the coupled tool unit need not be directly identified. It may be sufficient to identify operating data of the coupled tool unit indirectly by the identifying of the operating data of the drive unit, in particular along with it. In other words: it may be sufficient just to directly identify operating data of the drive unit.

The operating data may comprise or be, in particular in each case, a value and/or an amount.

The electric drive unit may comprise an electric motor for driving the coupled tool unit. In particular, the drive unit may be referred to as a drive motor unit. The operating data may be operating data of the electric motor.

In addition or as an alternative, the drive unit may comprise an electrical energy store, in particular a battery and/or a storage battery, for supplying the drive unit or its electric motor, if present, with electrical energy.

In particular, the drive unit may be referred to as a storage-battery drive unit. In other words: the drive unit may be configured independently of the electricity grid.

In particular, the drive unit and/or the coupled tool unit may be configured as hand-guided, in particular carried by hand, and/or floor-guided. Hand-guided, in particular carried by hand, may mean that the drive unit and/or the coupled tool unit can have a maximum mass of 50 kilograms (kg), in particular of 20 kg, in particular of 10 kg.

The drive unit may be configured for coupling to the tool unit releasably, in particular for coupling nondestructively and/or without tools. The coupling may be referred to as attaching or fastening. In particular, the tool unit may be referred to as an attachment tool unit.

In addition or as an alternative, the drive unit and/or the tool unit may comprise a coupling for driving the coupled tool unit.

In particular, the drive unit may be configured for producing a movement, in particular of a drive shaft of the drive unit, and for transmitting the movement produced to the coupled tool unit, in particular a tool shaft of the tool unit.

The different types of tool units may be differently constructed. In other words: the different types need not be structurally the same. In particular, the different types of tool units may make it possible to perform different kinds of work. The set of different types may include or be at least a gardening and/or forestry tool unit, in particular a number of gardening and/or forestry tool units.

In particular, the rotatory tool unit may be configured for movement, in particular of a tool of the tool unit, in one direction of movement, in particular only one direction of movement, in particular a rotational direction. The movement may describe the form of an uninterrupted curve, in particular a circle.

The non-rotatory tool unit may be configured for movement, in particular of a tool of the tool unit, in two directions of movement, in particular opposite directions of movement. In other words: the non-rotatory tool unit may be configured for a reversal of the direction of movement or a back-and-forth movement, in particular of the tool. The movement may describe the form of a not uninterrupted curve. In particular, the non-rotatory tool unit may be referred to as a reciprocative or translatory tool unit.

In particular, the type-specific control modes, in particular rotation control mode or non-rotation control mode, may be different from one another.

First, in particular for driving, identifying and/or determining, the drive unit may be controlled in an identification control mode. In detail, the drive unit may be configured to be put into the identification control mode and/or controlled in the identification control mode by a supply of electrical energy to the drive unit being interrupted and/or by the electrical energy store, if present, being disconnected, in particular when there is a change of the tool unit(s) on the drive unit. In addition or as an alternative, the drive unit may be configured to be controlled in the control mode, in particular if the drive unit has not been put into the identification control mode and/or the tool unit, in particular the coupled tool unit, has been identified and/or determined, in particular when re-starting or when running up the drive unit, in particular the next time, in particular when there is no change of the tool unit on the drive unit.

In particular, the driving or step a) and/or the controlling or step d) may be initiated by the user, in particular by actuating at least one operator control element or an accelerator such as at least one pushbutton. In particular, a rotation speed, in particular a setpoint rotation speed, of the drive unit and/or of the tool unit may be specified or determined by the user.

In particular, the drive unit may be speed-controlled. This may mean that, if an actual rotation speed of the drive unit deviates from a setpoint rotation speed, a current, a voltage and/or a power output of the drive unit can be re-adjusted. External influences on or by the coupled tool unit can or will typically act first on the rotation speed and, in particular only, as a consequence on the current, the voltage and/or the power output. It may depend on a setting of a controller, in particular a rotation speed controller, of the drive unit which variable, in particular the rotation speed, voltage, current and/or power output, may be more meaningful for the identification and/or determination.

Step c) may be performed at the same time as step b) and/or at a time after it. Step d) may be performed at the same time as step c) and/or at a time after it.

In a development of the invention, step b) comprises: identifying, in particular automatically identifying, operating data in the form of a temporal rotation speed, current, voltage and/or power characteristic of the drive unit. Furthermore, step c) comprises: determining, in particular automatically determining, that the coupled tool unit is, in particular either, a rotatory tool unit when or if the identified temporal rotation speed, current, voltage and/or power characteristic is free of a periodic oscillation, in particular a periodic rotation speed, current, voltage and/or power oscillation, or is a non-rotatory tool unit when or if the identified temporal rotation speed, current, voltage and/or power characteristic has a periodic oscillation.

Typically, in the case of the non-rotatory tool unit, a reversal of the direction of movement, in particular of the tool, if present, may occur. This strong translatory deceleration and acceleration at the points of reversal may bring about an increase in the load torque in the coupled drive unit. Consequently, with a drive torque that is constant over time, in particular with a constant rotation speed, constant current, constant voltage and/or constant power output, the periodic oscillation can be observed on the rotation speed, current, voltage and/or power characteristic, in particular with double the frequency of the tool movement. In particular, the periodic oscillation may be identified at a rotation speed that is constant, apart from the oscillation, or average. In other words: the oscillation need not or may not be identified when running up or during the running-up of the drive unit. In addition or as an alternative, an oscillation with a minimum amplitude equal to or greater than a limiting amplitude, in particular a specified limiting amplitude, may be considered to be the periodic oscillation.

This allows the criterion of periodic oscillation, in particular the presence or absence of a periodic oscillation, to be used for differentiating between a rotatory tool unit and a non-rotatory tool unit. The criterion may be referred to as a differentiating criterion.

In a development of the invention, if or when the determination in step c) reveals that the coupled tool unit is a non-rotatory tool unit, wherein the types include a first tool unit with a first transmission, in particular a constant transmission, and a second tool unit with a second transmission, in particular a constant transmission, differing from the first transmission, in step b) operating data in the form of a temporal rotation speed, current, voltage and/or power characteristic, in particular in the form of a temporal rotation speed characteristic, of the drive unit are identified, in particular automatically. Furthermore, in step c) a frequency of a, in particular the, periodic oscillation, in particular a periodic rotation speed, current, voltage and/or power oscillation, and a rotation speed, in particular an average rotation speed, are determined from the identified temporal rotation speed, current, voltage and/or power characteristic, in particular automatically. Furthermore, in step c) a transmission is determined or calculated from the determined frequency and the determined rotation speed, in particular automatically. Furthermore, in step c) it is determined, in particular automatically, that the coupled tool unit is, in particular either, a first tool unit when or if the determined transmission is in a first transmission range or is a second tool unit when or if the determined transmission is in a second transmission range differing from the first transmission range. Moreover, in step d) the drive unit is, in particular either, controlled in a first tool control mode when or if the coupled tool unit is determined to be a first tool unit or in a second tool control mode, in particular automatically, when or if the coupled tool unit is determined to be a second tool unit.

In particular, the first tool unit or the second tool unit may comprise a gear mechanism with the transmission.

This allows the criterion of transmission, in particular transmission value, to be used for differentiating between a first tool unit and a second tool unit.

The operating data for the criterion of transmission may be identified at a time before, at the same time as and/or at a time after the operating data for the criterion of rotatory or non-rotatory tool unit or periodic oscillation, if present. In particular, the operating data may be the same. In addition or as an alternative, the differentiation between a first tool unit and a second tool unit may be determined at a time before, at the same time as and/or at a time after the differentiation between a rotatory tool unit and a non-rotatory tool unit. In other words: the sequence of the criteria may, but need not, correspond to the sequence of the claims or their steps.

In one refinement of the invention, the first tool unit is hedge shears, in particular with cutters, or a hedge cutter, and the first tool control mode is a hedge shears control mode. In addition or as an alternative, the second tool unit is a special harvester, in particular with at least one rake, or an olive harvester, and the second tool control mode is a special harvester control mode.

Typically, the hedge shears may have a first transmission of 3.5 to 6.5, in particular of 4.5 to 5.5. The special harvester may have a second transmission of 10 to 12, in particular of 11. In other words: the first transmission and the second transmission may differ by a factor of 1.5 to 3.5, in particular of 2 to 3, in particular 2.5.

In particular, a problem case for the hedge shears may be a case of jamming or a case of catching, in particular of the cutters. The hedge shears control mode may make it possible to recognize this case of jamming and consequently resolve it. In particular, an opening, in particular of the cutters, may be performed, in particular by a reversal of movement, in particular before reaching customary or maximum points of reversal. Consequently, a case of jamming or a case of catching, in particular of the cutters in a branch, can be resolved independently or without user intervention. In addition or as an alternative, the hedge shears control mode may make it possible to perform an adaptation of the rotation speed to operate the hedge shears at an optimum rotation speed. This allows an optimum cutting result to be achieved. Also in addition or as an alternative, the hedge shears control mode may make it possible to perform a reversal of direction in the case of a, in particular each, re-start. This allows the transmission, in particular the gear mechanism, if present, to be relieved of load, and consequently its durability to be increased. Also in addition or as an alternative, the hedge shears control mode may make it possible to perform an enabling operation for high load or power peaks or to enable high load peaks. This allows a high cutting performance to be achieved.

In short: the hedge shears control mode may comprise at least one feature from the set made up of the case of jamming, adaptation of the rotation speed, reversal of the direction of rotation and/or enabling of the load.

The special harvester control mode may make it possible to perform a logic operation for fixing the acceleration. This allows easy continuous operation to be achieved. In particular, the user need not keep actuating the operator control element.

In a development of the invention, if or when the determination in step c) reveals that the coupled tool unit is a rotatory tool unit, wherein the types include a saw, in particular a pole pruner, in step b) operating data in the form of a temporal rotation speed, current, voltage and/or power characteristic, in particular in the form of a temporal power characteristic, of the drive unit are identified, in particular automatically. Furthermore, in step c) it is determined, in particular automatically, that the coupled tool unit is a saw when or if the identified temporal rotation speed, current, voltage and/or power characteristic has a dynamic oscillation, in particular a dynamic rotation speed, current, voltage and/or power oscillation. Furthermore, in step d) the drive unit is controlled in a saw control mode, in particular automatically, when or if the coupled tool unit is determined to be a saw.

Typically, in the case of the saw, in particular with a saw chain, it may not be necessary for every tooth of the saw always to be in full engagement, in particular when cutting wood. Each new engagement of a saw tooth in the wood can bring about a great deceleration. Consequently, in particular when there is a constant rotation speed over time, a constant current over time, a constant voltage over time and/or a constant power output over time, the dynamic oscillation may occur on the rotation speed, current, voltage and/or power characteristic. In particular, the dynamic oscillation may be identified at a rotation speed that is constant, apart from the oscillation. In other words: the oscillation need not or may not be identified when running up or during the running-up of the drive unit. In addition or as an alternative, an oscillation with a minimum amplitude equal to or greater than a limiting amplitude, in particular a specified limiting amplitude, may be considered to be the dynamic oscillation. Also in addition or as an alternative, an oscillation with a frequency from a frequency range, in particular a specified frequency range, may be considered to be the dynamic oscillation.

The saw control mode may make possible a high starting torque, in particular when running up the next time. Consequently, a powerful start can be achieved, in particular when a chain is lying on the branch. In addition or as an alternative, the saw control mode may make possible a smooth start, in particular when running up the next time. This allows a small torque, in particular in the wrist of the user, and/or easy starting to be achieved. Also in addition or as an alternative, the saw control mode may make possible a high braking torque. Also in addition or as an alternative, the saw control mode may make it possible to enable a boost, in particular for short cuts with high power. This allows a risk of damaging neighbouring branches to be reduced or even avoided.

In short: the saw control mode may comprise at least one feature from the set made up of a high starting torque, smooth starting, a high braking torque and/or enabling a boost.

This allows the criterion of dynamic oscillation, in particular the presence or absence of a dynamic oscillation, to be used for differentiating between a saw and not a saw.

The operating data for the criterion of dynamic oscillation may be identified at a time before, at the same time as and/or at a time after the operating data for the criterion of rotatory or non-rotatory tool unit or periodic oscillation, if present. In particular, the operating data may be the same. In addition or as an alternative, the differentiation between a saw and not a saw may be determined at a time before, at the same time as and/or at a time after the differentiation between a rotatory tool unit and a non-rotatory tool unit. In other words: the sequence of the criteria may, but need not, correspond to the sequence of the claims or their steps.

In a development of the invention, if or when the determination in step c) reveals that the coupled tool unit is a rotatory tool unit and that the identified operating data do not have a dynamic oscillation, wherein the types include a blower device, in step b) operating data in the form of a temporal rotation speed characteristic and a temporal current, voltage and/or power characteristic of the drive unit are identified, in particular automatically. Furthermore, in step c) it is determined, in particular automatically, that the coupled tool unit is not a blower device when or if the identified temporal current, voltage and/or power characteristic presents a variation, in particular a current, voltage and/or power variation, with a temporally constant rotation speed. Furthermore, in step d) the drive unit is controlled, in particular automatically, in a non-blower device control mode when or if the coupled tool unit is determined not to be a blower device.

Typically, the blower device need not or may not undergo any external load in normal use. Consequently, the blower device can be ruled out as the coupled tool unit if there is a variation, in particular at a constant rotation speed. In other words: the variation need not or may not be identified when running up or during the running-up of the drive unit. In other words: a blower device need not be recognized, but the blower device may just be ruled out. In addition or as an alternative, a variation equal to or greater than a limiting variation, in particular a specified limiting variation, and/or a variation over a minimum time period, in particular a specified minimum time period, may be considered to be the variation. In other words: in the case of the blower device, variations may be possible to a slight extent, in particular if a blowing tube of the blower device is dynamically opened and closed, for example in the attempt to detach dirt from the ground with the blowing tube. However, these variations may typically be small, in particular less than the limiting variation, and/or only of a short time duration. In particular, the blower device may be referred to as a leaf blower.

This allows the criterion of variation, in particular the presence or absence of a variation, to be used for differentiating between not a blower device and, in particular possibly, a blower device.

The operating data for the criterion of variation may be identified at a time before, at the same time as and/or at a time after the operating data for the criterion of rotatory or non-rotatory tool unit or periodic oscillation and/or the criterion of dynamic oscillation, if present. In particular, the operating data may be the same. In addition or as an alternative, the differentiation between not a blower device and, in particular possibly, a blower device may be determined at a time before, at the same time as and/or at a time after the differentiation between a rotatory tool unit and a non-rotatory tool unit and/or the differentiation between a saw and not a saw, if present. In other words: the sequence of the criteria may, but need not, correspond to the sequence of the claims or their steps.

In a development of the invention, if or when the determination in step c) reveals that the coupled tool unit is a rotatory tool unit and that the identified operating data do not have a dynamic oscillation and have a variation with a temporally constant rotation speed, wherein the types include a tool unit with a flexible tool shaft, in step b) operating data in the form of a temporal rotation speed characteristic of the drive unit are identified, in particular automatically. Furthermore, in step c) it is determined, in particular automatically, that the coupled tool unit is a tool unit with a flexible tool shaft when or if the identified temporal rotation speed characteristic presents at least one undershooting in or within a certain or specified rotation speed range. Furthermore, in step d) the drive unit is controlled in a flexshaft control mode, in particular automatically, when or if the coupled tool unit is determined to be a tool unit with a flexible tool shaft.

Typically, the tool unit or its flexible tool shaft may begin to oscillate when there is strong acceleration, in particular when running up or during the running-up. This oscillating may be identified or detected and/or determined in the rotation speed characteristic, in particular when running up. In other words: the undershooting need not or may not be identified at a constant rotation speed of the drive unit. In the case of a tool unit without a flexible tool shaft, in particular with a rigid tool shaft, the tool shaft need not or may not vibrate as a result of its greater stiffness and/or a gear mechanism, if present, may additionally dampen the oscillation. In addition or as an alternative, an undershooting with a minimum height equal to or greater than a limiting height, in particular a specified limiting height, and/or an undershooting with a time period in a time period range, in particular a specified time period range, may be considered to be the undershooting. The time period may make it possible to prevent erroneous identifications on the basis of external loads in the case of a tool unit without a flexible tool shaft. The rotation speed range may be referred to as a rotation speed band.

The flexible tool shaft may be referred to as a flexshaft. In particular, the tool unit with the flexible tool shaft may be a scythe with a bent or curved shaft, an edge trimmer with a bent or curved shaft or a brush cutter with a bent or curved shaft, and in particular without a gear mechanism.

The flexshaft control mode may make it possible to enable or activate operation at a high rotation speed. In addition or as an alternative, the flexshaft control mode may make possible an adaptation of a characteristic curve, in particular power output against rotation speed. This allows good feedback to the user to be achieved. Also in addition or as an alternative, the flexshaft control mode may make it possible to perform a rotation speed limitation for operating, in particular the brush cutter with a bent shaft, and in particular without a gear mechanism, at a limited rotation speed.

In short: the flexshaft control mode may comprise at least one feature from the set made up of enabling the rotation speed, adapting the characteristic curve and/or limiting the rotation speed.

This allows the criterion of undershooting, in particular the presence or absence of an undershooting, to be used for differentiating between a tool unit with a flexible tool shaft and without a flexible tool shaft.

The operating data for the criterion of undershooting may be identified at a time before, at the same time as and/or at a time after the operating data for the criterion of rotatory or non-rotatory tool unit or periodic oscillation, the criterion of dynamic oscillation and/or the criterion of variation, if present. In particular, the operating data may be the same. In addition or as an alternative, the differentiation between a tool unit with a flexible tool shaft and without a flexible tool shaft may be determined at a time before, at the same time as and/or at a time after the differentiation between a rotatory tool unit and a non-rotatory tool unit, the differentiation between a saw and not a saw and/or the differentiation between not a blower device and, in particular possibly, a blower device, if present. In other words: the sequence of the criteria may, but need not, correspond to the sequence of the claims or their steps.

In a development of the invention, if or when the determination in step c) reveals that the coupled tool unit is a rotatory tool unit and that the identified operating data do not have a dynamic oscillation, have a variation with a temporally constant rotation speed and do not have an undershooting in a certain rotation speed range, wherein the types include a wire brush cutter or a first cutting-blade brush cutter, a second cutting-blade brush cutter or a floor-guided tool unit, in step b) operating data in the form of a temporal rotation speed characteristic and a temporal current characteristic of the drive unit are identified, in particular automatically. Furthermore, in step c) a mass moment of inertia is determined or calculated, in particular automatically, from the identified temporal rotation speed characteristic and the identified temporal current characteristic. Furthermore, in step c) it is determined, in particular automatically, that the coupled tool unit is, in particular either, a wire brush cutter or a first cutting-blade brush cutter when or if the determined mass moment of inertia is within a first mass moment of inertia range, or is a second cutting-blade brush cutter when or if the determined mass moment of inertia is within a second mass moment of inertia range differing from the first mass moment of inertia range, or is a floor-guided tool unit when or if the determined mass moment of inertia is within a third mass moment of inertia range differing from the first and the second mass moment of inertia ranges. Furthermore, in step d) the drive unit is controlled in, in particular either, a first brush cutter control mode when or if the coupled tool unit is determined to be a wire brush cutter or a first cutting-blade brush cutter, or in a second brush cutter control mode when or if the coupled tool unit is determined to be a second cutting-blade brush cutter, or is controlled, in particular automatically, in a floor control mode when or if the coupled tool unit is determined to be a floor-guided tool unit.

Typically, the first mass moment of inertia range and the second mass moment of inertia range may differ by a factor of 1.5 to 5, in particular of 2 to 4, in particular 3. In particular, the first mass moment of inertia range may be lower than the second mass moment of inertia range. In addition or as an alternative, the first mass moment of inertia range and the third mass moment of inertia range may differ by a factor of 1.5 to 4, in particular of 2 to 3, in particular 2.5. In particular, the first mass moment of inertia range may be higher than the third mass moment of inertia range.

In particular, the operating data for the mass moment of inertia may be identified when running up or during the running-up, in particular of the rotation speed, of the drive unit. In other words: the operating data for the mass moment of inertia need not or may not be identified at a constant rotation speed of the drive unit.

The wire brush cutter may be a brush cutter with a mowing line, in particular a flexible or dimensionally unstable mowing line. In addition or as an alternative, the cutting-blade brush cutter may be a brush cutter with a cutting blade, in particular a rigid or dimensionally stable cutting blade. In particular, the first cutting-blade brush cutter may have a grass cutting blade, in particular a double grass cutting blade. In addition or as an alternative, the second cutting-blade brush cutter may have a brush blade, in particular a triple brush blade. Also in addition or as an alternative, the floor-guided tool unit may be a sweeping roller, a sweeping brush or a rotary tiller.

In particular, the first brush cutter control mode may make it possible to perform a rotation speed limitation for operating, in particular the wire brush cutter, at a limited rotation speed. This allows low sound values and/or a high running time, in particular of the electrical energy store, if present, to be achieved. In addition or as an alternative, a great speed invariability can be achieved. Also in addition or as an alternative, the first brush cutter control mode may make possible an adaptation of accelerating torques, in particular when running up, and/or of braking torques, in particular when running down. This allows the same accelerating and/or braking times to be achieved for different types of tool units.

In short: the first brush cutter control mode may comprise at least one feature from the set made up of limiting the rotation speed and/or adapting the accelerating and/or braking torque.

The second brush cutter control mode may make possible or enable or allow a brief idling when accelerating. This allows a familiar behaviour to be achieved, in particular a behaviour familiar from a drive unit with an internal combustion engine. In addition or as an alternative, the second brush cutter control mode may make possible an adaptation, in particular an increase, of acceleration torques, in particular when running up, and/or of braking torques, in particular when running down. This allows the same accelerating and/or braking times to be achieved for different types of tool units, or accelerating and/or braking times to be maintained. Also in addition or as an alternative, the second brush cutter control mode may make it possible to perform an enabling operation for high load or power peaks or to enable high load peaks. This allows a high cutting performance and/or a rapid re-acceleration to be achieved.

In short: the first brush cutter control mode may comprise at least one feature from the set made up of enabling idling, adapting the accelerating and/or braking torque and/or enabling a load.

The floor control mode may make possible a smooth start, in particular when running up the next time, in particular of the sweeping roller or the sweeping brush, if present. This allows a small torque, in particular in the wrist of the user, and/or easy starting to be achieved. In addition or as an alternative, the floor control mode may make possible a slight rotation speed limitation, in particular of the rotary tiller, if present. This allows better engagement with the ground. Also in addition or as an alternative, the floor control mode may make possible an adaptation of accelerating torques, in particular when running up, and/or of braking torques, in particular when running down. This allows the same accelerating and/or braking times to be achieved for different types of tool units.

In short: the floor control mode may comprise at least one feature from the set made up of smooth starting, rotation speed limitation and/or adaptation of the accelerating and/or braking torque.

This allows the criterion of mass moment of inertia, in particular mass moment of inertia value, to be used for differentiating between a wire brush cutter and a first cutting-blade brush cutter, a second cutting-blade brush cutter and a floor-guided tool unit.

The operating data for the criterion of mass moment of inertia may be identified at a time before, at the same time as and/or at a time after the operating data for the criterion of rotatory or non-rotatory tool unit or periodic oscillation, the criterion of dynamic oscillation, the criterion of variation and/or the criterion of undershooting, if present. In particular, the operating data may be the same. In addition or as an alternative, the differentiation between a wire brush cutter and a first cutting-blade brush cutter, a second cutting-blade brush cutter and a floor-guided tool unit may be determined at a time before, at the same time as and/or at a time after the differentiation between a rotatory tool unit and a non-rotatory tool unit, the differentiation between a saw and not a saw, the differentiation between not a blower device and, in particular possibly, a blower device and/or the differentiation between a tool unit with a flexible tool shaft and without a flexible tool shaft, if present. In other words: the sequence of the criteria may, but need not, correspond to the sequence of the claims or their steps.

In one refinement of the invention, if or when the determination in step c) reveals that the coupled tool unit is a wire brush cutter or a first cutting-blade brush cutter, in step b) operating data in the form of a temporal power characteristic of the drive unit are identified, in particular automatically. Furthermore, in step c) a load or a power output is determined from the identified temporal power characteristic on the identified temporal rotation speed characteristic, in particular automatically. Furthermore, in step c) it is determined, in particular automatically, that the coupled tool unit is, in particular either, a wire brush cutter when or if the determined load is within a first load range or power range, or is a first cutting-blade brush cutter when or if the determined load is within a second load range or power range differing from the first load range or power range. Furthermore, in step d) the drive unit is controlled in, in particular either, a wire brush cutter control mode when or if the coupled tool unit is determined to be a wire brush cutter, or is controlled, in particular automatically, in a cutting-blade brush cutter control mode when or if the coupled tool unit is determined to be a first cutting-blade brush cutter.

Typically, the first load range and the second load range may differ by a factor of 1.5 to 4, in particular of 2 to 3, in particular 2.5. In particular, the first load range may be higher than the second load range. In particular, the first load range and the second load range may in each case be a load range above a rotation speed range, in particular an area-based load and speed range. The first load range and the second load range may be separated from one another by a first limiting line. In addition, the first load range may be limited by a second limiting line, which is higher than the first limiting line.

In particular, the operating data for the load or the load may be identified and/or determined at a rotation speed that is constant over time. In other words: the operating data for the load need not or may not be identified when running up or during the running-up, in particular of the rotation speed, of the drive unit.

The criterion of load may be assessed in at least one of three functions, in particular basic load assessment without loading, load collective of duration with loading, and/or high load.

The load or the power output that can be identified or determined, in particular at a constant rotation speed without tool engagement, may depend primarily on a friction in the gear mechanism, if present, of the tool unit and/or a resistance of the air. This load may be referred to as the basic load. Typically, in the case of the wire brush cutter, the air load, and consequently the basic load, may be higher than in the case of the first cutting-blade brush cutter.

In particular, the basic load may be defined or determined as follows: a small power variation, in particular less than a limiting variation, in particular a specified limiting variation, for a time period, in particular a specified time period, in particular a minimum time period. A constant rotation speed for the time period. A rotation speed equal to or greater than a limiting rotation speed, in particular a specified limiting rotation speed.

During operation, in particular during an engagement, of the tool unit or of a tool of the tool unit, the tool unit or its tool may be subjected to a load, whereby the required power output may increase. In other words: the power output, in particular the power output required, may be brought down by external loading but never become less than the basic load without loading. This load may be referred to as the load collective of duration.

In particular, with the load collective of duration, an operating point of a setpoint rotation speed may be equal to an actual rotation speed, but the load or the power output are not regarded as constant. In this case, the power components (with a steady-state rotation speed) may be assessed with regard to their level or variation in comparison with a limiting line (basic load lines). In this case, an undershooting of a limiting line may be assessed as greater by a multiple than an overshooting, since it may generally be caused or have been caused by an external load. As a result, just a small number of power components can be taken to suggest a tool unit of a lower power class or of a lower load range.

In the case of the first cutting-blade brush cutter, a permanently high power output need not or may not be drawn. In particular, the power output may briefly dip down with each point of reversal, in particular when mowing. These small power components may be smaller than the basic load of the wire brush cutter at this rotation speed. This allows the first cutting-blade brush cutter to be differentiated from the wire brush cutter. In other words: if the determined load lies below the first limiting line, the wire brush cutter can be ruled out.

In particular, the wire brush cutter control mode may make it possible to perform a rotation speed limitation for operating at a limited rotation speed. This allows low sound values and/or a high running time, in particular of the electrical energy store, if present, to be achieved.

The cutting-blade brush cutter control mode may make it possible to enable operation at a high rotation speed, in particular a rotation speed higher than the limited rotation speed. This allows a high cutting performance to be achieved. In addition or as an alternative, the cutting-blade brush cutter control mode may make possible or enable or allow a brief idling when accelerating. This allows a familiar behavior to be achieved, in particular a behavior familiar from a drive unit with an internal combustion engine. Also in addition or as an alternative, the cutting-blade brush cutter control mode may make possible an adaptation, in particular an increase, of acceleration torques, in particular when running up, and/or of braking torques, in particular when running down. This allows the same accelerating and/or braking times to be achieved for different types of tool units, or accelerating and/or braking times to be maintained. Also in addition or as an alternative, the cutting-blade brush cutter control mode may make it possible to perform an enabling operation for high load or power peaks or to enable high load peaks. This allows a high cutting performance and/or a rapid re-acceleration to be achieved.

In short: the first brush cutter control mode may comprise at least one feature from the set made up of enabling a rotation speed, enabling idling, adapting the accelerating and/or braking torque and/or enabling a load.

This allows the criterion of load, in particular load value, to be used for differentiating between a wire brush cutter and a first cutting-blade brush cutter.

The operating data for the criterion of load may be identified at a time before, at the same time as and/or at a time after the operating data for the criterion of rotatory or non-rotatory tool unit or periodic oscillation, the criterion of dynamic oscillation, the criterion of variation, the criterion of undershooting and/or the criterion of mass moment of inertia, if present. In particular, the operating data may be the same. In addition or as an alternative, the differentiation between a wire brush cutter and a first cutting-blade brush cutter may be determined at a time before, at the same time as and/or at a time after the differentiation between a rotatory tool unit and a non-rotatory tool unit, the differentiation between a saw and not a saw, the differentiation between not a blower device and, in particular possibly, a blower device, the differentiation between a tool unit with a flexible tool shaft and without a flexible tool shaft and/or the differentiation between a wire brush cutter and a first cutting-blade brush cutter, a second cutting-blade brush cutter and a floor-guided tool unit, if present. In other words: the sequence of the criteria may, but need not, correspond to the sequence of the claims or their steps.

In a development of the invention, if or when the determination in step c) reveals that the coupled tool unit is a rotatory tool unit and that the identified operating data do not have a dynamic oscillation and do not have a variation with a temporally constant rotation speed, wherein the types include a blower device, in step b) operating data in the form of a temporal rotation speed characteristic, a temporal current characteristic and a temporal power characteristic of the drive unit are identified, in particular automatically. Furthermore, in step c) a mass moment of inertia is determined from the identified temporal rotation speed characteristic and the identified temporal current characteristic, in particular automatically. Furthermore, in step c) a load is determined from the identified temporal power characteristic on the identified temporal rotation speed characteristic, in particular automatically. Furthermore, in step c) it is determined, in particular automatically, that the coupled tool unit is a blower device when or if the determined mass moment of inertia is within a, in particular first, mass moment of inertia range and if the determined load is within a third load range. Moreover, in step d), the drive unit is controlled, in particular automatically, in a blower device control mode when or if the coupled tool unit is determined to be a blower device.

In particular, the third load range may be different from the first load range and/or the second load range, if present. Typically, the third load range and the first load range may differ by a factor of 1.5 to 4, in particular of 2 to 3, in particular 2.5. In particular, the third load range may be higher than the first load range. In particular, the third load range may be a load range above a rotation speed range, in particular an area-based load and speed range. The third load range and the first load range may be separated from one another by the second limiting line.

In particular, the blower device may have a very high basic load. The basic load may be higher than a basic load, and in particular than a load collective of duration, of the wire brush cutter, if present. In other words: if the determined load lies above the second limiting line, the wire brush cutter can be ruled out. Typically, the blower device can be always operated in basic load, and consequently always assessed or recognized or determined.

The blower device control mode may make it possible to perform a rotation speed limitation for operating at a limited rotation speed. This allows low sound values and/or a high running time, in particular of the electrical energy store, if present, to be achieved. In addition or as an alternative, the blower device control mode may make it possible to enable operation at a high rotation speed, in particular a rotation speed higher than the limited rotation speed, in particular for a short time. In other words: the blower device control mode may make it possible to enable a boost, in particular with a high power output. This allows a high blowing performance to be achieved. Also in addition or as an alternative, the blower device control mode may make possible a smooth start, in particular when running up the next time. This allows a small torque, in particular in the wrist of the user, and/or easy starting to be achieved. Also in addition or as an alternative, the blower device control mode may make possible an adaptation, in particular an increase, of braking torques, in particular when running down. This allows the same braking times to be achieved for different types of tool units, or braking times to be maintained. In addition or as an alternative, a rapid termination of the flow, in particular a termination of the air flow, can be achieved for precise cleaning.

In short: the blower device control mode may comprise at least one feature from the set made up of rotation speed limitation, enabling the rotation speed, enabling a boost, smooth starting and/or adapting a braking torque.

This allows the criterion of mass moment of inertia and load, in particular mass moment of inertia value and load value, to be used for differentiating between a blower device and not a blower device.

The operating data for the criterion of mass moment of inertia and load may be identified at a time before, at the same time as and/or at a time after the operating data for the criterion of rotatory or non-rotatory tool unit or periodic oscillation, the criterion of dynamic oscillation, the criterion of variation, the criterion of undershooting, the criterion of mass moment of inertia and/or the criterion of load, if present. In particular, the operating data may be the same. In addition or as an alternative, the differentiation between a blower device and not a blower device may be determined at a time before, at the same time as and/or at a time after the differentiation between a rotatory tool unit and a non-rotatory tool unit, the differentiation between a saw and not a saw, the differentiation between not a blower device and, in particular possibly, a blower device, the differentiation between a tool unit with a flexible tool shaft and without a flexible tool shaft, the differentiation between a wire brush cutter and a first cutting-blade brush cutter, a second cutting-blade brush cutter and a floor-guided tool unit and/or the differentiation between a wire brush cutter and a first cutting-blade brush cutter, if present. In other words: the sequence of the criteria may, but need not, correspond to the sequence of the claims or their steps.

The invention also relates to a system, which may in particular be configured for performing the method described above. The system according to the invention comprises an electric drive unit, an identification device, in particular an electric identification device, a determination device, in particular an electric determination device, and a controller device, in particular an electric controller device. The drive unit is configured for coupling and driving a tool unit. The tool unit is selected from a set of different types of tool units. The set includes at least one rotatory tool unit and at least one non-rotatory tool unit. The identification device is configured for identifying operating data of the drive unit during the driving procedure. The determination device is configured for determining, based on the identified operating data, whether the coupled tool unit is a rotatory tool unit or a non-rotatory tool unit. The controller device is configured for controlling the drive unit in a rotation control mode if the coupled tool unit is determined to be a rotatory tool unit or in a non-rotation control mode if the coupled tool unit is determined to be a non-rotatory tool unit.

The system can make possible the same advantages as the method described above. In particular, the electric drive unit may be partly or entirely configured as described above for the method. The system may be referred to as a tool system.

In particular, the drive unit may comprise the identification device, the determination device and/or the controller device. In addition or as an alternative, the drive unit, the identification device, the determination device and/or the controller device may interact with one another, in particular comprise at least one cableless or cable-bound signal connection to one another.

The identification device may comprise at least one electrical sensor for identifying the operating data. In addition or as an alternative, the identification device may comprise a storage device, in particular an electrical or electronic and/or magnetic storage device, for storing the identified operating data.

The determination device may comprise a processor, in particular a CPU, for determining the tool unit, in particular the coupled tool unit. In addition or as an alternative, the identification device may comprise a storage device, in particular an electrical or electronic and/or magnetic storage device, for storing the criterion/criteria, in particular at least one characteristic map comprising the criterion/the criteria.

The controller device may comprise a processor, in particular a CPU, for controlling the drive unit. In addition or as an alternative, the controller device may comprise a storage device, in particular an electrical or electronic and/or magnetic storage device, for storing the type-specific control types. Also in addition or as an alternative, the controller device may comprise a motor controller or motor electronics, in particular a converter.

In a development of the invention, the system comprises at least one, in particular the, tool unit, which is configured for coupling and driving by the drive unit. In particular, the tool unit may be partly or completely configured as described above for the method.

Further advantages and aspects of the invention emerge from the claims and from the following description of preferred exemplary embodiments of the invention, which are explained below on the basis of the figures.

DETAILED DESCRIPTION OF THE DRAWINGS

FIGS. 2, 3, 5, 7, 8, 10 and 11 show a system SY according to an embodiment of the invention. The system SY comprises an electric drive unit AE, an identification device EE, a determination device BE and a controller device SE. The drive unit AE is configured for coupling and driving a tool unit WE. The tool unit WE is selected from a set of different types of tool units WE. The set includes at least one rotatory tool unit RWE and at least one non-rotatory tool unit NRWE. The identification device EE is configured for identifying operating data BD of the drive unit AE during the driving procedure. The determination device BE is configured for determining, based on the identified operating data BD, whether the coupled tool unit WE is a rotatory tool unit RWE or a non-rotatory tool unit NRWE. The controller device SE is configured for controlling the drive unit AE in a rotation control mode if the coupled tool unit WE is determined to be a rotatory tool unit RWE, or in a non-rotation control mode if the coupled tool unit WE is determined to be a non-rotatory tool unit NRWE.

Figure 2:
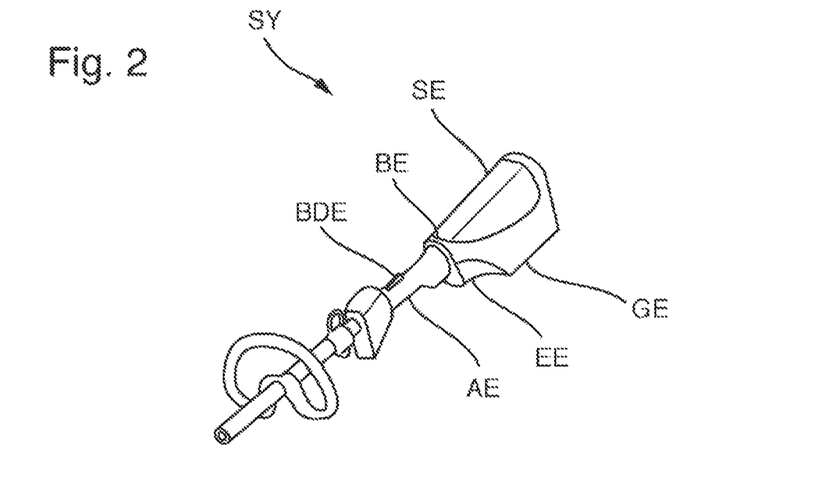
FIG. 2 is a perspective view of a system according to an embodiment of the invention comprising a drive unit, an identification device, a determination device and a controller device.

In the exemplary embodiment shown, the drive unit AE comprises the identification device EE, the determination device BE and the controller device SE. In other words: the system SY comprises a housing GE, in which the drive unit AE, the identification device EE, the determination device BE and the controller device SE are arranged. In alternative exemplary embodiments, the drive unit, the identification device, the determination device and/or the controller device may be configured separately from one another.

Figure 3:
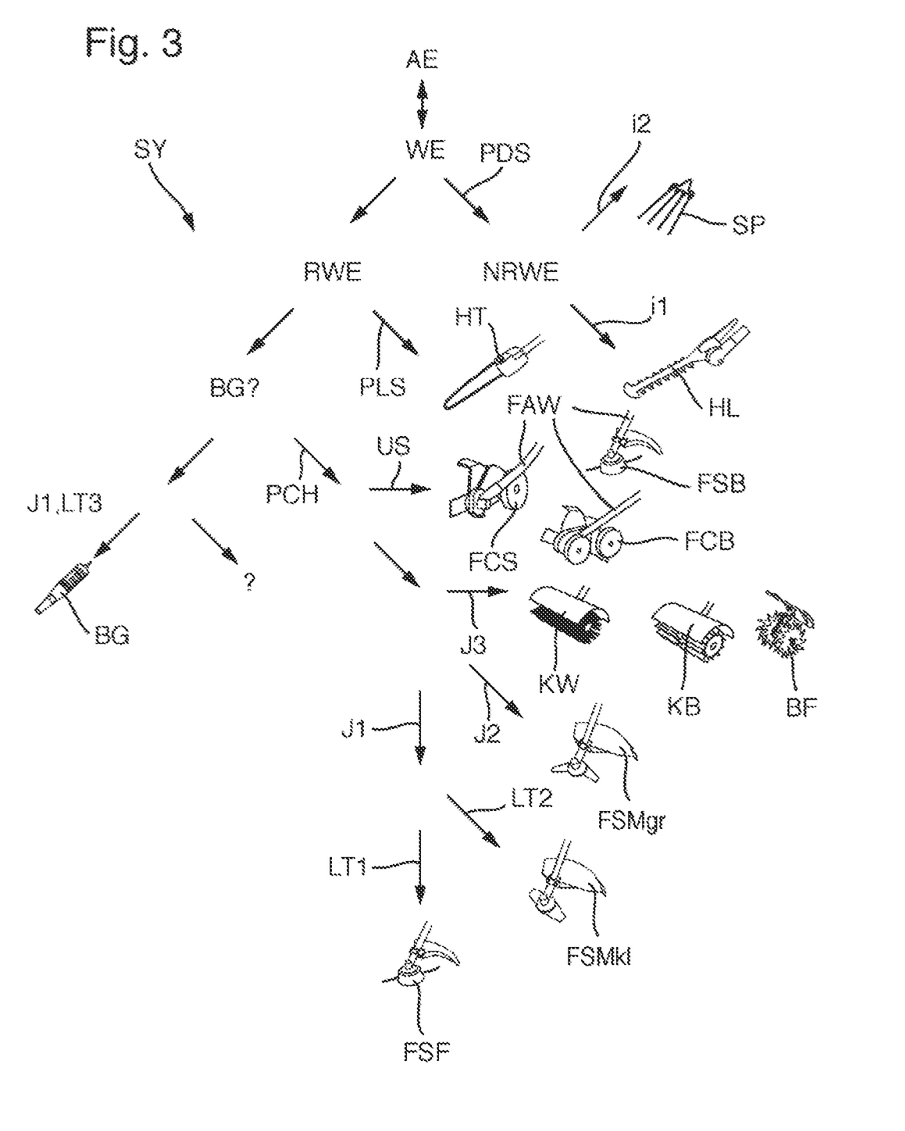
FIG. 3 is a further perspective view of the system comprising at least one tool unit, in particular a set of different types of tool units, arranged in a diagram comprising differentiating criteria.

In detail, the system SY comprises the at least one tool unit WE, which is configured for coupling and driving by the drive unit AE. In the exemplary embodiment shown, the system SY comprises the set of different types of tool units WE.

The drive unit AE also comprises an electric motor for driving the tool unit WE, in particular the coupled tool unit WE.

In addition, the drive unit AE comprises an electrical energy store for supplying the drive unit AE or its electric motor with electrical energy.

Furthermore, the drive unit AE comprises at least one user-actuable operator control element BDE for initiating the driving or the controlling.

In detail, the drive unit AE is speed-controlled or comprises a controller. A setpoint rotation speed of the drive unit AE or its electric motor or of the tool unit WE may be specified or calculated by the user or the operator control element BDE, in particular by way of a potentiometer or a potentiometer voltage, in particular by means of the drive unit AE and/or the controller device SE.

In the exemplary embodiment shown, the operating data are input variables, in particular variables of the electric motor. In detail, this is the rotation speed, in particular in the unit rpm (revolutions per minute) and/or with a resolution of 1 rpm; Setpoint rotation speed, in particular with a resolution of 1 rpm; Current, in particular absolute value of the phase current at the time with block commutation or a torque-forming current Iq and/or with a resolution of 100 milliamperes; and/or Voltage, in particular average phase voltage at the time and/or with a resolution of 1 millivolt.

The current, in particular the phase current, and the voltage, in particular the phase voltage, can be used to determine or calculate, in particular by multiplication, a power output, in particular in the unit watts (W).

Figure 1:
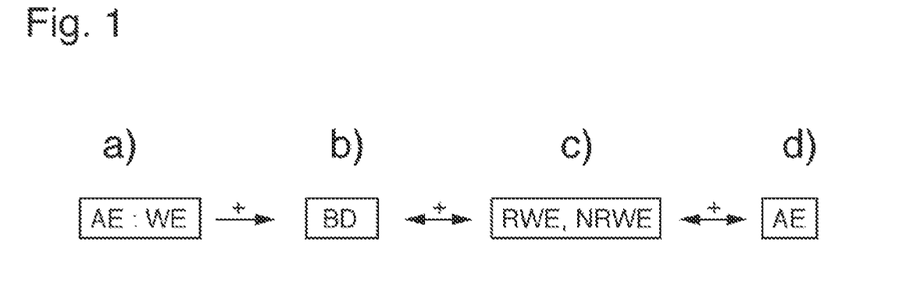
FIG. 1 is a flow diagram of an exemplary method according to the invention.

FIG. 1 shows a method according to an embodiment of the invention for type-specific operating of the electric drive unit AE, in particular by means of the previously described system SY. The drive unit AE is configured for coupling and driving the tool unit WE. The tool unit WE is selected from the set of different types of tool units WE. The set includes the at least one rotatory tool unit RWE and the at least one non-rotatory tool unit NRWE. The method comprises the steps: a) driving the coupled tool unit WE by the drive unit AE; b) identifying operating data BD of the drive unit AE during the driving procedure, in particular by way of the identification device EE; c) determining, based on the identified operating data BD, whether the coupled tool unit WE is a rotatory tool unit RWE or a non-rotatory tool unit, in particular by way of the determination device BE; and d) controlling the drive unit in a, in particular the, rotation control mode if the coupled tool unit WE is determined to be a rotatory tool unit RWE, or in a, in particular the, non-rotation control mode if the coupled tool unit WE is determined to be a non-rotatory tool unit NRWE, in particular by way of the controller device SE.

In detail, step b) comprises: identifying operating data BD in the form of a temporal rotation speed, current, voltage and/or power characteristic nA of the drive unit AE, in particular when there is a substantially constant rotation speed nA'. Step c) also comprises: determining that the coupled tool unit WE is a rotatory tool unit RWE if the identified temporal rotation speed, current, voltage and/or power characteristic nA is free of a periodic oscillation PDS, or is a non-rotatory tool unit NRWE if the identified temporal rotation speed, current, voltage and/or power characteristic nA has a periodic oscillation PDS.

Figure 4:
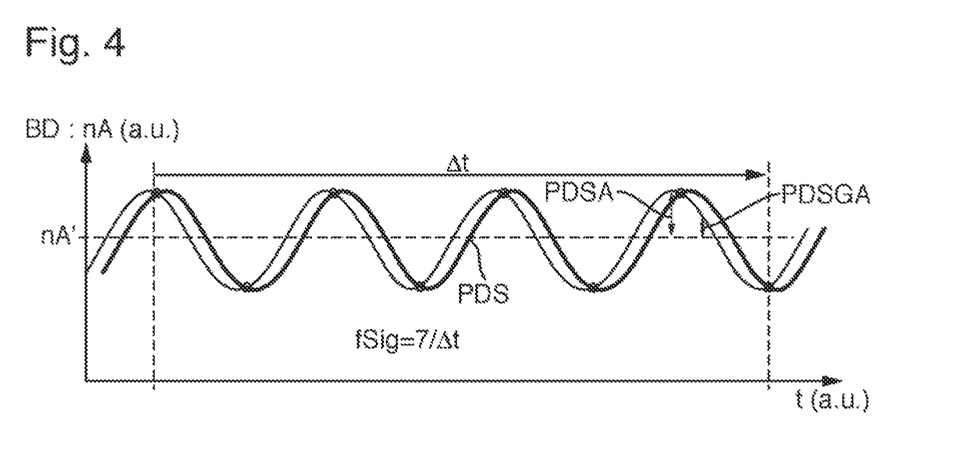
FIG. 4 is a graph showing a temporal rotation speed characteristic comprising a periodic oscillation.

In FIG. 4, the temporal rotation speed characteristic nA has the periodic oscillation PDS, in particular with a minimum amplitude PDSA greater than a limiting amplitude PDSGA.

Figure 5:
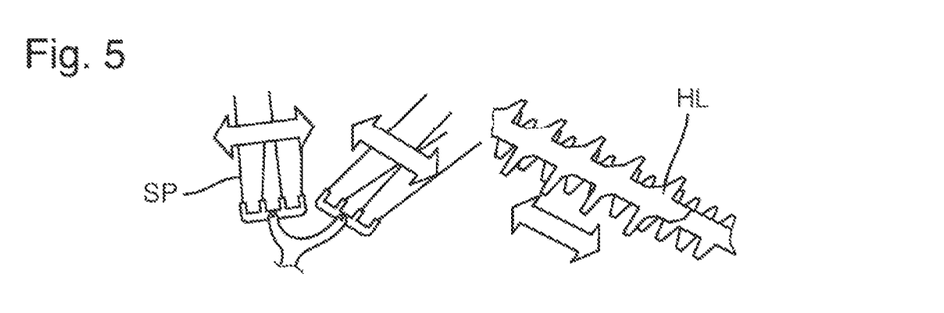
FIG. 5 is a perspective view of two non-rotatory tool units, in each case at a reversal of a direction of movement.

In detail, the at least one non-rotatory tool unit NRWE is configured for the reversal of a direction of movement, in particular of its tool, as shown in FIG. 5 by arrows. This reversal causes the periodic oscillation PDS.

This allows the criterion of periodic oscillation PDS to be used for differentiating between a rotatory tool unit RWE and a non-rotatory tool unit NRWE.

If the determination in step c) reveals that the coupled tool unit WE is a non-rotatory tool unit NRWE, wherein the types include a first tool unit HL with a first transmission i1 and a second tool unit SP with a second transmission i2 differing from the first transmission, in step b) operating data BD in the form of the temporal rotation speed, current, voltage and/or power characteristic nA of the drive unit AE are identified, or the operating data BD have been identified at a time before. In FIG. 4, the operating data BD are the same. Furthermore, in step c) a frequency fSig of the periodic oscillation PDS and the rotation speed nA', in particular the substantially constant or average rotation speed nA', are determined from the identified temporal rotation speed characteristic nA. Furthermore, in step c), a transmission i is determined from the determined frequency fSig and the determined rotation speed nA'. Furthermore, in step c) it is determined that the coupled tool unit is a first tool unit HL if the determined transmission i is in a first transmission range i1 or is a second tool unit SP if the determined transmission i is in a second transmission range i2 differing from the first transmission range. Moreover, in step d) the drive unit AE is controlled in a first tool control mode if the coupled tool unit WE is determined to be a first tool unit HL or in a second tool control mode if the coupled tool unit WE is determined to be a second tool unit SP.

In detail, the frequency fSig of the tool movement has the following relationship with the periodic oscillation PDS at the rotation speed nA': fSig=nA'/i/60*2. If this equation is rearranged, the transmission i can be calculated from the frequency fSig and the rotation speed nA', which in particular allows a clear conclusion to be drawn about the coupled tool unit.

In the exemplary embodiment shown in FIG. 4, the operating data BD are slightly filtered to make the desired characteristic of the rotation speed of the sought frequencies more visible. In particular, a simple PT1 filter may be used. The filtered operating data are shifted along the time axis t, such as by 3 milliseconds. A difference between the filtered operating data and the filtered and shifted operating data is formed. Zero crossings of the difference are determined, a zero crossing corresponding to a crossing of the filtered operating data and the filtered and shifted operating data, as shown in FIG. 4 by circles. A plurality of points of intersection is determined over a certain time period, or a time period for a certain plurality of points of intersection is determined. The frequency fSig is calculated from the plurality of points of intersection and the time difference delta. The frequency fSig is determined in continual repetition to check for when there is a frequency that remains the same. Only when the frequency fSig is constant and remains the same at a constant rotation speed nA' is the frequency fSig considered to be determined or recognized. In the present case, the frequency fSig is determined from the time difference delta after 7 points of intersection.

In the exemplary embodiment shown in FIGS. 3 and 5, the first tool unit HL is hedge shears and the first tool control mode is a hedge shears control mode. The second tool unit SP is a special harvester and the second tool control mode is a special harvester control mode.

The frequency fSig of the hedge shears HL is approximately 63 Hertz (Hz) at the rotation speed nA' of 10 000 rpm of the drive unit AE or its electric motor. The frequency fSig of the special harvester is approximately 32 Hz at the rotation speed nA' of 10 000 rpm.

This allows the criterion of transmission i to be used for differentiating between a first tool unit HL, in particular the hedge shears, and a second tool unit SP, in particular the special harvester.

Figure 6:
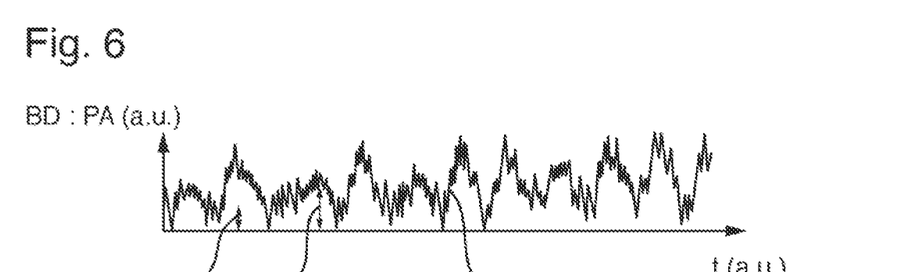
FIG. 6 is a graph showing a temporal power characteristic comprising a dynamic oscillation.

If the determination in step c) reveals that the coupled tool unit WE is a rotatory tool unit RWE, wherein the types include a saw HT, in particular a pole pruner, in step b) operating data BD in the form of a temporal rotation speed, current, voltage and/or power characteristic PA of the drive unit AE are identified, in particular with a substantially constant rotation speed nA'. Furthermore, it is determined in step c) that the coupled tool unit WE is a saw HT if the identified temporal rotation speed, current, voltage and/or power characteristic PA has a dynamic oscillation PLS. Furthermore, in step d) the drive unit AE is controlled in a saw control mode if the coupled tool unit WE is determined to be a saw HT.

In FIG. 6, the temporal power characteristic PA has the dynamic oscillation PLS, in particular with a minimum amplitude PLSA greater than a limiting amplitude PLSGA and with a frequency from a certain frequency range.

In detail, with the power output PA, oscillations with a very high amplitude PLSA and an approximate frequency of 75 to 90 Hz, on average of 80 Hz, occur at the rotation speed nA' of 10 000 rpm of the drive unit AE or its electric motor.

Both the approximate frequency and the height of the amplitude PLSA of the dynamic oscillation PLS are different from the amplitude PDSA and the frequency fSig of the periodic oscillation PDS. In particular, the dynamic oscillation PLS is not purely periodic.

In the exemplary embodiment shown, the operating data BD are on the one hand filtered slightly and on the other hand filtered more. Subsequently, a difference is formed. As a result, extremely simple bandpass filtering (frequency factor) is obtained. If the amplitude of the filtered operating data exceeds a certain threshold, a counter (temporal factor) is incremented. If the counter reaches a certain threshold, the saw HT is considered to have been recognized.

This allows the criterion of dynamic oscillation PLS to be used for differentiating between a saw HT and not a saw.

Figure 7:
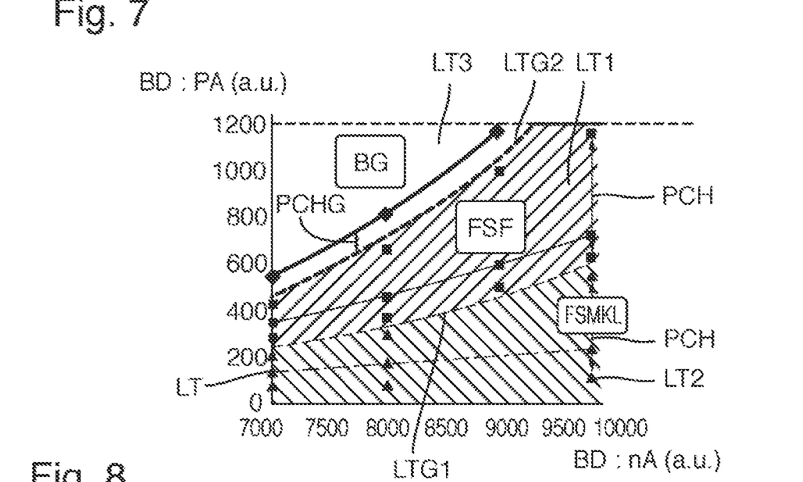
FIG. 7 is a graph showing a power characteristic against a rotation speed characteristic comprising a first load range, a second load range and a third load range.

If the determination in step c) reveals that the coupled tool unit WE is a rotatory tool unit RWE and that the identified operating data BD do not have a dynamic oscillation PLS, wherein the types include a blower device BG, in step b) operating data BD in the form of a, in particular the, temporal rotation speed characteristic nA and a, in particular the, temporal current, voltage and/or power characteristic PA of the drive unit AE are identified, or the operating data BD have been identified at a time before, in particular at a constant rotation speed nA. Furthermore, it is determined in step c) that the coupled tool unit WE is not a blower device BG if the identified temporal current, voltage and/or power characteristic PA has a variation PCH, in particular greater than a limiting variation PCHG and over a minimum time period, with a temporally constant rotation speed nA. Furthermore, in step d), the drive unit AE is controlled in a non-blower device control mode if the coupled tool unit WE is determined not to be a blower device BG.

Typically, the blower device BG does not undergo any external load in normal use, as FIG. 7 shows. Consequently, the blower device BG can be ruled out as the coupled tool unit WE if there is a variation PCH, in particular at a constant rotation speed nA.

This allows the criterion of variation PCH to be used for differentiating between not a blower device and, in particular possibly, a blower device BG.

Figure 8:
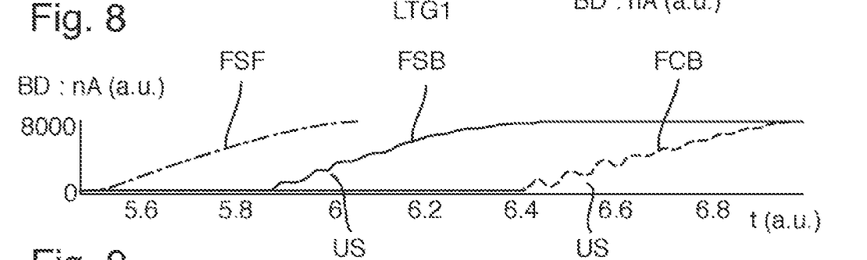
FIG. 8 is a graph showing further temporal rotation speed characteristics partly comprising at least one undershooting.
Figure 9:
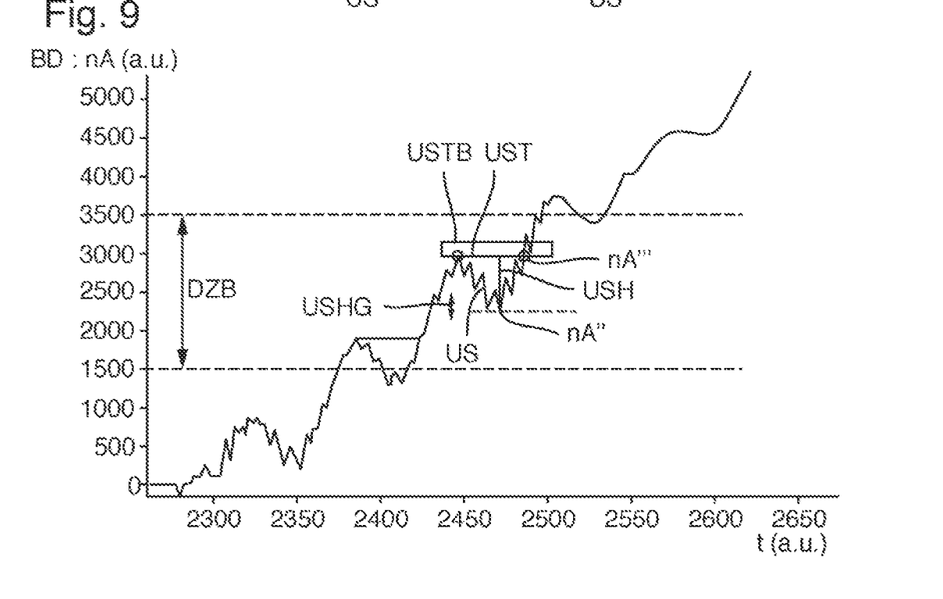
FIG. 9 is a graph showing a further temporal rotation speed characteristic comprising at least one undershooting.

If the determination in step c) reveals that the coupled tool unit WE is a rotatory tool unit RWE and that the identified operating data BD do not have a dynamic oscillation and have a variation PCH with a temporally constant rotation speed nA, wherein the types include a tool unit FCS, FCB, FSB with a flexible tool shaft FAW, in step b) operating data BD in the form of a, in particular the, temporal rotation speed characteristic nA of the drive unit AE are identified, in particular when running up the rotation speed nA. Furthermore, it is determined in step c) that the coupled tool unit WE is a tool unit FCS, FCB, FSB with a flexible tool shaft FAW if the identified temporal rotation speed characteristic nA has at least one undershooting US in a certain rotation speed range DZB. Furthermore, in step d) the drive unit AE is controlled in a flexshaft control mode if the coupled tool unit WE is determined to be a tool unit FCS, FCB, FSB with a flexible tool shaft FAW.

In particular, the tool unit WE with the flexible tool shaft FAW is a scythe with a bent shaft FCS, an edge trimmer with a bent shaft FCB or a brush cutter with a bent shaft FSB, and in particular without a gear mechanism.

In FIG. 8, the temporal rotation speed characteristics in the middle and on the right and in FIG. 9 the temporal rotation speed characteristic nA in the rotation speed range DZB, in particular from 1000 rpm to 3500 rpm, have at least one undershooting US, in particular with a minimum height USH greater than a limiting height USHG and a time period UST in a specified time period range USTB.

In the exemplary embodiment shown, the height USH of the maximum undershooting US is assessed. The undershooting US is calculated as the difference between the maximum characteristic of the rotation speed nA''' (can only rise) and the actual rotation speed nA''. In dependence on the height USH, a decision is made to differentiate a wire brush cutter FSF.

This allows the criterion of undershooting US to be used for differentiating between a tool unit FCS, FCB, FSB with a flexible tool shaft FAW and without a flexible tool shaft.

Figure 10:
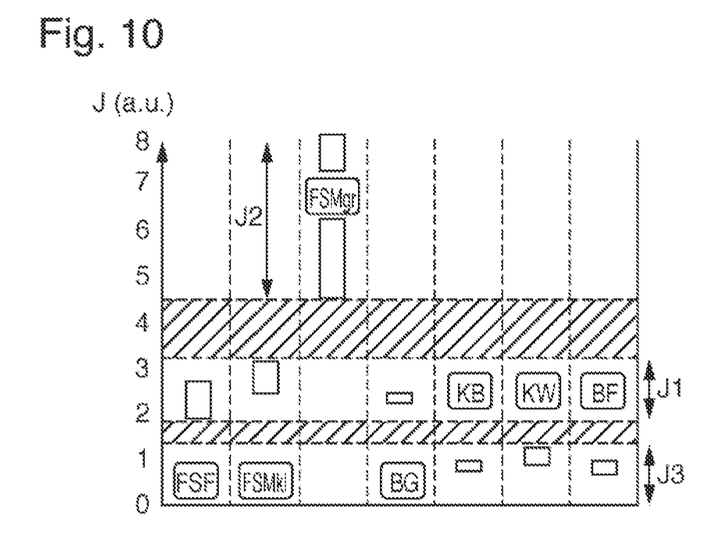
FIG. 10 is a diagram showing some of the set of different types of tool units arranged in a first mass moment of inertia range, a second mass moment of inertia range or a third mass moment of inertia range.

If the determination in step c) reveals that the coupled tool unit WE is a rotatory tool unit RWE and that the identified operating data BD do not have a dynamic oscillation, have a variation PCH with a temporally constant rotation speed nA and do not have an undershooting in a certain rotation speed range DZB, wherein the types include a wire brush cutter FSF or a first cutting-blade brush cutter FSMkl, a second cutting-blade brush cutter FSMgr or a floor-guided tool unit KW, KB, BF, in step b) operating data in the form of a, in particular the, temporal rotation speed characteristic nA and a, in particular the, temporal current characteristic IA of the drive unit AE are identified, or the operating data BD have been identified at a time before, in particular when running up the rotation speed nA. Furthermore, in step c) a mass moment of inertia J is determined from the identified temporal rotation speed characteristic nA and the identified temporal current characteristic IA. Furthermore, it is determined in step c) that the coupled tool unit WE is a wire brush cutter FSF or a first cutting-blade brush cutter FSMkl if the determined mass moment of inertia J is within a first mass moment of inertia range J1, or is a second cutting-blade brush cutter FSMgr if the determined mass moment of inertia J is within a second mass moment of inertia range J2 differing from the first mass moment of inertia range, or is a floor-guided tool unit KW, KB, BF if the determined mass moment of inertia J is within a third mass moment of inertia range J3 differing from the first and the second mass moment of inertia ranges. Furthermore, in step d) the drive unit AE is controlled in a first brush cutter control mode if the coupled tool unit WE is determined to be a wire brush cutter FSF or a first cutting-blade brush cutter FSMkl, or in a second brush cutter control mode if the coupled tool unit WE is determined to be a second cutting-blade brush cutter FSMgr, or is controlled in a floor control mode if the coupled tool unit WE is determined to be a floor-guided tool unit KW, KB, KF.

In particular, the first mass moment of inertia range J1 is lower than the second mass moment of inertia range J2, as shown in FIG. 10. Furthermore, the first mass moment of inertia range J1 is higher than the third mass moment of inertia range J3.

The floor-guided tool unit is a sweeping roller KW, a sweeping brush KB or a rotary tiller BF.

Figure 11:
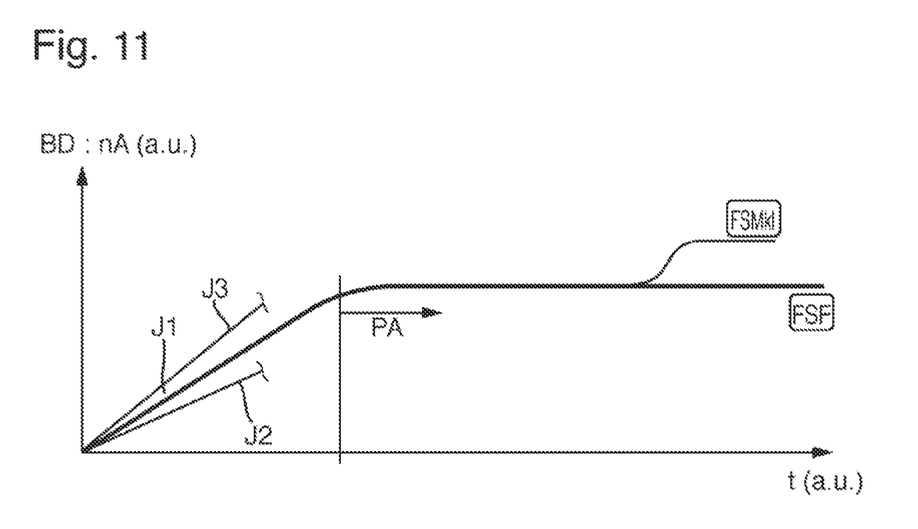
FIG. 11 is a graph showing a further temporal rotation speed characteristic for determination of a mass moment of inertia.

In detail, the mass moment of inertia J (inertial moment) indicates the resistance of a rigid body with respect to an acceleration $\alpha$ about its own axis. The mass moment of inertia J has the following relationship with a torque M and the resultant acceleration $\alpha$: $J=M/\alpha$. According to this equation, the mass moment of inertia J can be calculated from the torque M and the resultant acceleration $\alpha$.

In the exemplary embodiment shown in FIG. 11, the calculation of the mass moment of inertia J of the tool unit WE, in particular the coupled tool unit WE, is somewhat simplified. The acceleration $\alpha$ and the torque or the drive unit torque M are averaged by a number of computing steps (averaging between two rotation speed limits). It need not or is not calculated with the actual drive unit torque, but just with the torque-forming current Iq. This gives a relative measure of the mass moment of inertia J and not an absolute value. A transmission i, if present, is not included in the calculation, it is only assessed which resistance acts on the drive unit AE under the acceleration.

Since a current Id during the acceleration at low rotation speeds is at approximately 0 and an absolute value of the drive unit torque M is not required, the following simplification is sufficient: M~Iq. This leads to $Iq=J*d\omega/dt$. A rotation speed increment $d\omega$ is constant and can in particular be set by way of a parameter. The difference in the measures of the mass moment of inertia J is attributable to the level of the respective current Iq and a plurality of added-together current values (plurality=duration in milliseconds for a rotation speed increment $d\omega$).

As shown in FIG. 11, the mass moment of inertia J of the tool unit WE, in particular the coupled tool unit WE, is identified or determined during an acceleration process. In this case, the current Iq at the time (proportional to the drive unit torque) in time-discrete steps is summated over a number of rotation speed increments. At the end of each rotation speed increment $d\omega$, the sum of the currents is divided by the rotation speed increment. As a result, a measure of the mass moment of inertia J is obtained from each rotation speed increment $d\omega$. After reaching the final rotation speed of the calculations of the mass moment of inertia J, an average value is formed from the individual calculated measures of the mass moment of inertia.

In the exemplary embodiment shown, a limit value, in particular for the measure of the mass moment of inertia, between the first mass moment of inertia range J1 and the second mass moment of inertia range J2 is 4; in particular, the first mass moment of inertia range J1 is lower than the limit value 4. Furthermore, a limit value, in particular for the measure of the mass moment of inertia, between the first mass moment of inertia range J1 and the third mass moment of inertia range J3 is 1.5; in particular, the third mass moment of inertia range J3 is lower than the limit value 1.5.

This allows the criterion of mass moment of inertia J to be used for differentiating between a wire brush cutter FSF and a first cutting-blade brush cutter FSMkl, a second cutting-blade brush cutter FSMgr and a floor-guided tool unit KW, KB, KF.

If the determination in step c) reveals that the coupled tool unit WE is a wire brush cutter FSF or a first cutting-blade brush cutter FSMkl, in step b) operating data BD in the form of a, in particular the, temporal power characteristic PA of the drive unit AE are identified, or the operating data BD have been identified at a time before, in particular at a constant rotation speed nA. Furthermore, in step c) a load LT is determined from the identified temporal power characteristic PA on the identified temporal rotation speed characteristic nA. Furthermore, in step c) it is determined that the coupled tool unit WE is a wire brush cutter FSF if the determined load LT is within a first load range LT1, or is a first cutting-blade brush cutter FSMkl if the determined load LT is within a second load range LT2 differing from the first load range. Furthermore, in step d) the drive unit AE is controlled in a wire brush cutter control mode if the coupled tool unit WE is determined to be a wire brush cutter FSF, or is controlled in a cutting-blade brush cutter control mode if the coupled tool unit WE is determined to be a first cutting-blade brush cutter FSMkl.

In particular, the first load range LT1 is higher than the second load range LT2, as shown in FIG. 7. In detail, the first load range LT1 and the second load range LT2 are separated from one another by a first limiting line LTG1, a dashed line in FIG. 7.

In the exemplary embodiment shown, a basic load line, in particular a thin and solid basic load line, of the wire brush cutter FSF is supported or denoted by the following pairs of values (power output PA against rotation speed nA): 236 W against 7500 rpm, 245 W against 7700 rpm, 290 W against 8300 rpm, 335 W against 8800 rpm, 390 W against 9300 rpm, 485 W against 9600 rpm.

The wire brush cutter control mode makes it possible to perform a rotation speed limitation for operating at a limited rotation speed such as 7700 rpm, as shown in FIG. 11. The cutting-blade brush cutter control mode makes it possible, but the other type-specific control modes apart from the wire brush cutter control mode may also make it possible, to enable operation at a high rotation speed, in particular higher than the limited rotation speed, such as 10 000 rpm.

This allows the criterion of load LT to be used for differentiating between a wire brush cutter FSF and a first cutting-blade brush cutter FSMkl.

If the determination in step c) reveals that the coupled tool unit WE is a rotatory tool unit RWE and that the identified operating data BD do not have a dynamic oscillation and do not have a variation with a temporally constant rotation speed nA, wherein the types include a, in particular the, blower device BG, in step b) operating data BD in the form of a, in particular the, temporal rotation speed characteristic nA, a, in particular the, temporal current characteristic IA and a, in particular the, temporal power characteristic PA of the drive unit AE are identified, or the operating data BD have been identified at a time before; in particular, the current characteristic IA when running up the rotation speed nA and the power characteristic PA at a constant rotation speed nA. Furthermore, in step c) a, in particular the, mass moment of inertia J is determined from the identified temporal rotation speed characteristic nA and the identified temporal current characteristic IA. Furthermore, in step c) a, in particular the, load LT is determined from the identified temporal power characteristic PA on the identified temporal rotation speed characteristic nA. Furthermore, in step c) it is determined that the coupled tool unit WE is a blower device BG if the determined mass moment of inertia J is within a, in particular the, first mass moment of inertia range J1 and if the determined load LT is within a third load range LT3. Moreover, in step d) the drive unit is controlled in a blower device control mode if the coupled tool unit WE is determined to be a blower device BG.

In particular, the third load range LT3 is higher than the first load range LT1, as shown in FIG. 7. In detail, the third load range LT3 and the first load range LT1 are separated from one another by a second limiting line LTG2, a dashed line in FIG. 7.

In the exemplary embodiment shown, a basic load line, in particular a thick and solid basic load line, of the blower device BG is supported or denoted by the following pairs of values (power output PA against rotation speed nA): 110 W against 3500 rpm, 175 W against 4400 rpm, 210 W against 4700 rpm, 235 W against 5050 rpm, 325 W against 5600 rpm, 410 W against 6100 rpm, 520 W against 6650 rpm, 620 W against 7200 rpm, 750 W against 7600 rpm, 950 W against 8200 rpm, 1200 W against 8900 rpm.

In the exemplary embodiment shown in FIG. 11, the mass moment of inertia J is determined at a time before the load LT.

This allows the criterion of mass moment of inertia J and load LT to be used for differentiating between a blower device BG and not a blower device.

As the exemplary embodiments shown and explained above make clear, the invention provides an advantageous method for operating an electric drive unit that has improved properties, in particular more functionalities, and also a system. In particular, the method and the system or the type-specific control mode of the drive unit make it possible to operate the coupled tool unit optimally and/or to recognize and consequently solve or even avoid from the outset at least a type-specific problem or at least a type-specific problem case of the coupled tool unit. The type-specific control mode of the drive unit is made possible by determining the type of the coupled tool unit, in particular indirectly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for type-specific operating of an electric drive unit, wherein the drive unit is configured for coupling and driving a tool unit, wherein the tool unit is selected from a set of different types of tool units, and wherein the set includes at least one rotatory tool unit and at least one non-rotatory tool unit, the method comprising the steps of:
   a) driving a coupled tool unit by the drive unit;
   b) identifying operating data of the drive unit during the driving of the coupled tool unit;

c) determining, based on the identified operating data, whether the coupled tool unit is a rotatory tool unit or a non-rotatory tool unit; and d) controlling the drive unit in a rotation control mode if the coupled tool unit is determined to be a rotatory tool unit, or in a non-rotation control mode if the coupled tool unit is determined to be a non-rotatory tool unit.

2. The method according to claim 1, wherein the step b) comprises: identifying operating data in the form of a temporal rotation speed, current, voltage and/or power characteristic of the drive unit, wherein the step c) comprises: determining that the coupled tool unit is a rotatory tool unit if the identified temporal rotation speed, current, voltage and/or power characteristic is free of a periodic oscillation, or is a non-rotatory tool unit if the identified temporal rotation speed, current, voltage and/or power characteristic has a periodic oscillation.

3. The method according to claim 2, wherein:

if the determination in step c) identifies that the coupled tool unit is a non-rotatory tool unit, wherein types include a first tool unit with a first transmission and a second tool unit with a second transmission differing from the first transmission, then:

in step b), operating data in the form of a temporal rotation speed, current, voltage and/or power characteristic of the drive unit are identified, in step c), a frequency of a periodic oscillation and a rotation speed are determined from the identified temporal rotation speed, current, voltage and/or power characteristic, a transmission is determined from the determined frequency and the determined rotation speed, and the coupled tool unit is determined to be a first tool unit if the determined transmission is in a first transmission range, or is determined to be a second tool unit if the determined transmission is in a second transmission range differing from the first transmission range, and in step d), the drive unit is controlled in a first tool control mode if the coupled tool unit is determined to be a first tool unit, or in a second tool control mode if the coupled tool unit is determined to be a second tool unit.

4. The method according to claim 3, wherein the first tool unit is hedge shears and the first tool control mode is a hedge shears control mode, and/or the second tool unit is a special harvester and the second tool control mode is a special harvester control mode.

5. The method according to claim 2, wherein:

if the determination in step c) identifies that the coupled tool unit is a rotatory tool unit, wherein types include a saw, then in step b), operating data in the form of a temporal rotation speed, current, voltage and/or power characteristic of the drive unit are identified, in step c), the coupled tool unit is determined to be a saw if the identified temporal rotation speed, current, voltage and/or power characteristic has a dynamic oscillation, and in step d), the drive unit is controlled in a saw control mode if the coupled tool unit is determined to be a saw.

6. The method according to claim 2, wherein:

if the determination in step c) identifies that the coupled tool unit is a rotatory tool unit and that the identified operating data do not have a dynamic oscillation, wherein types include a blower device, then in step b), operating data in the form of a temporal rotation speed characteristic and a temporal rotation speed, current, voltage and/or power characteristic of the drive unit are identified, in step c), the coupled tool unit is determined not to be a blower device if the identified temporal current, voltage and/or power characteristic presents a variation with temporally constant rotation speed, and in step d), the drive unit is controlled in a non-blower device control mode if the coupled tool unit is determined not to be a blower device.

7. The method according to claim 2, wherein:

if the determination in step c) identifies that the coupled tool unit is a rotatory tool unit and that the identified operating data do not have a dynamic oscillation and have a variation with temporally constant rotation speed, wherein types include a tool unit with a flexible tool shaft, then in step b), operating data in the form of a temporal rotation speed characteristic of the drive unit are identified, in step c), the coupled tool unit is determined to be a tool unit with a flexible tool shaft if the identified temporal rotation speed characteristic presents at least one undershooting in a certain rotation speed range, and in step d), the drive unit is controlled in a flexshaft control mode if the coupled tool unit is determined to be a tool unit with a flexible tool shaft.

8. The method according to claim 2, wherein:

if the determination in step c) identifies that the coupled tool unit is a rotatory tool unit and that the identified operating data do not have a dynamic oscillation, have a variation with temporally constant rotation speed, and do not have an undershooting in a certain rotation speed range, wherein types include a wire brush cutter, or a first cutting-blade brush cutter, a second cutting-blade brush cutter, or a floor-guided tool unit, then in step b), operating data in the form of a temporal rotation speed characteristic and a temporal current characteristic of the drive unit are identified, in step c), a mass moment of inertia is determined from the identified temporal rotation speed characteristic and the identified temporal current characteristic, and the coupled tool unit is determined to be a wire brush cutter or a first cutting-blade brush cutter if the determined mass moment of inertia is within a first mass moment of inertia range, or is determined to be a second cutting-blade brush cutter if the determined mass moment of inertia is within a second mass moment of inertia range differing from the first mass moment of inertia range, or is determined to be a floor-guided tool unit if the determined mass moment of inertia is within a third mass moment of inertia range differing from the first and the second mass moment of inertia ranges, and in step d), the drive unit is controlled in a first brush cutter control mode if the coupled tool unit is determined to be a wire brush cutter or a first cutting-blade brush cutter, or in a second brush cutter control mode if the coupled tool unit is determined to be a second cutting-blade brush cutter, or is controlled in a floor control mode if the coupled tool unit is determined to be a floor-guided tool unit.

9. The method according to claim 8, wherein:
if the determination in step c) identifies that the coupled tool unit is a wire brush cutter or a first cutting-blade brush cutter, then
in step b), operating data in the form of a temporal power characteristic of the drive unit are identified,
in step c), a load is determined from the identified temporal power characteristic on the identified temporal rotation speed characteristic, and
the coupled tool unit is determined to be a wire brush cutter if the determined load is within a first load range, or is determined to be a first cutting-blade brush cutter if the determined load is within a second load range differing from the first load range, and
in step d), the drive unit is controlled in a wire brush cutter control mode if the coupled tool unit is determined to be a wire brush cutter, or is controlled in a cutting-blade brush cutter control mode if the coupled tool unit is determined to be a first cutting-blade brush cutter.

10. The method according to claim 2, wherein:
if the determination in step c) identifies that the coupled tool unit is a rotatory tool unit and that the identified operating data do not have a dynamic oscillation and do not have a variation with temporally constant rotation speed,
wherein types include a blower device, then
in step b), operating data in the form of a temporal rotation speed characteristic, a temporal current characteristic and a temporal power characteristic of the drive unit are identified,
in step c), a mass moment of inertia is determined from the identified temporal rotation speed characteristic and the identified temporal current characteristic,
a load is determined from the identified temporal power characteristic on the identified temporal rotation speed characteristic, and
the coupled tool unit is determined to be a blower device if the determined mass moment of inertia is within a first mass moment of inertia range and if the determined load is within a third load range, and
in step d), the drive unit is controlled in a blower device control mode if the coupled tool unit is determined to be blower device.

11. A system, comprising:
an electric drive unit, wherein the drive unit is configured for coupling and driving a tool unit, wherein the tool unit is selected from a set of different types of tool units, wherein the set includes at least one rotatory tool unit and at least one non-rotatory tool unit,
an identification device, wherein the identification device is configured for identifying operating data of the drive unit during the driving of the tool unit,
a determination device, wherein the determination device is configured for determining, based on the identified operating data, whether the coupled tool unit is a rotatory tool unit or a non-rotatory tool unit, and
a controller device, wherein the controller device is configured for controlling the drive unit in a rotation control mode if the coupled tool unit is determined to be a rotatory tool unit, or in a non-rotation control mode if the coupled tool unit is determined to be a non-rotatory tool unit.

12. The system according to claim 11, further comprising:
at least one tool unit which is configured for coupling and driving by the drive unit.

* * * * *